(No Model.)
R. R. SPEARS.
LIFTING JACK.
No. 295,300. Patented Mar. 18, 1884.
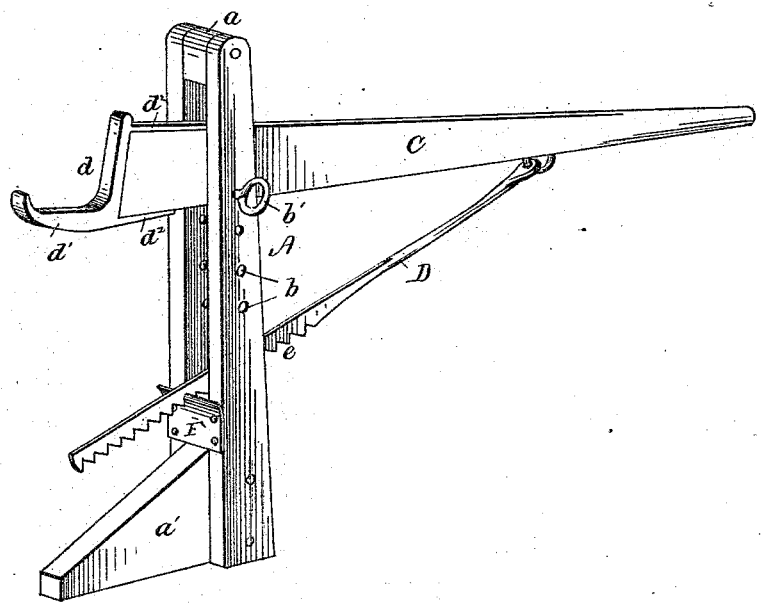
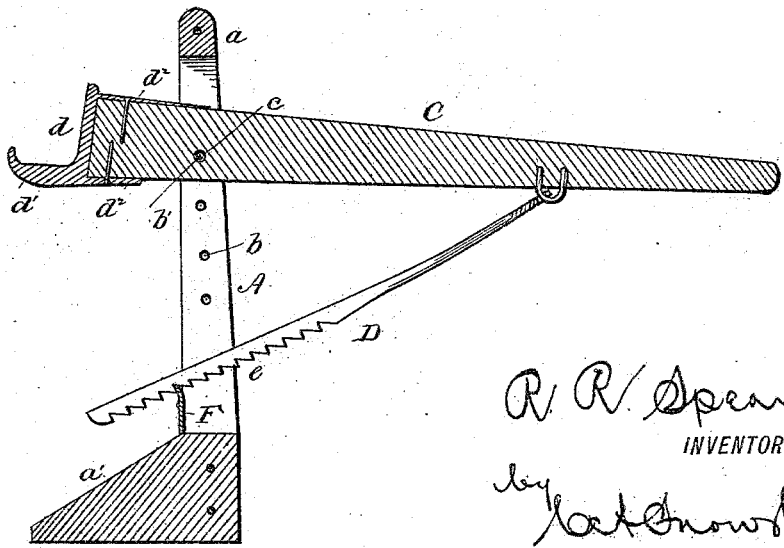
WITNESSES
R. R. Spears
INVENTOR
Attorneys

UNITED STATES PATENT OFFICE.

RALPH REED SPEARS, OF WHEELING, WEST VIRGINIA.

LIFTING-JACK.

SPECIFICATION forming part of Letters Patent No. 295,300, dated March 18, 1884.

Application filed December 26, 1883. (No model.)

*To all whom it may concern:*

Be it known that I, RALPH R. SPEARS, a citizen of the United States, residing at Wheeling, in the county of Ohio and State of West Virginia, have invented a new and useful Improvement in Lifting-Jacks, of which the following is a specification, reference being had to the accompanying drawings.

My invention relates to lifting-jacks; and it has for its object to provide a device of this character which shall be cheap, simple, and durable in its construction and thoroughly effective in its operation. With these ends in view the invention consists in the improved construction and combinations of parts, hereinafter fully described, and pointed out in the claims.

In the drawings, Figure 1 is a perspective view of a lifting-jack constructed in accordance with my invention. Fig. 2 is a vertical section of the same.

A represents two vertical standards or uprights connected at their upper ends by a block or cross-bar, $a$, and at their lower ends by a supporting-beam, $a'$. The standards or uprights A are provided on their sides with any desired number of perforations, $b$, to receive a bolt or rod, $b'$, which passes through a perforation, $c$, in the lever C, thereby pivoting said lever between the parallel uprights A. This lever C is provided at its upper end with a bracket or casting, $d$, having the angular portion $d'$, which is slightly cut away to form a seat for the axle of a vehicle when it is desired to raise the same, and is also provided with the arms $d^2$, which embrace the end of the lever C, thus forming a secure connection. Near the lower end of the lever C is pivoted, by means of an eyebolt or staple, a rack-bar, which is provided at its end with a perforation to receive said staple or eyebolt, or, if desired, the same may be secured by a hinge to the lever C. This rack-bar D is formed with the teeth $e$, which engage with a plate or strip of metal, F, secured to the sides of the standards A.

From the foregoing description it will be apparent, that when it is desired, the lever C may be vertically adjusted by removing the pin or bolt $b'$ to one of the lower or higher perforations or openings, as may be desired.

The operation is as follows: The jack is placed adjacent to the wheel of the carriage, and the bracket $d$ placed under the axle to engage therewith, and upon the depression of the lever C the wheel of the carriage will be raised a sufficient distance from the ground to allow of its removal, the rack-bar D engaging with the plate F, thus preventing the lowering of the axle, except in the event of the rack-bar being removed, which is the case when it is desired to lower the axle and wheel.

Thus it will be seen that while my improvement is simple and cheap in its construction it is effective in its operation.

Having fully described my invention, what I claim as new, and desire to secure by Letters Patent, is—

1. In a lifting-jack, the combination, with two uprights, of a lever pivoted between said uprights, said lever being provided with an angular bracket at one end, its other end being provided with a pivoted rack-bar to engage with a plate upon the said standards, substantially as set forth.

2. In a lifting-jack, the combination, with two uprights, of a lever pivoted between said uprights, said lever being provided with an angular bracket, $d$, having the extensions or arms $a^2$, to engage the ends of the lever at one end, and provided near its lower end with a pivoted rack-bar to engage a strip or plate secured to the sides of the standards or uprights, substantially as set forth.

In testimony that I claim the foregoing as my own I have hereto affixed my signature in presence of two witnesses.

RALPH REED SPEARS.

Witnesses:
JOHN H. DOWNS, Jr.,
J. W. PULTZ.